United States Patent
He et al.

(10) Patent No.: US 8,051,310 B2
(45) Date of Patent: Nov. 1, 2011

(54) METHOD FOR REDUCING POWER CONSUMPTION OF PROCESSOR

(75) Inventors: Zhiqiang He, Beijing (CN); Zihua Guo, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 722 days.

(21) Appl. No.: 12/159,397

(22) PCT Filed: Mar. 23, 2006

(86) PCT No.: PCT/CN2006/000478
§ 371 (c)(1),
(2), (4) Date: Jun. 27, 2008

(87) PCT Pub. No.: WO2007/073632
PCT Pub. Date: Jul. 5, 2007

(65) Prior Publication Data
US 2009/0013201 A1    Jan. 8, 2009

(30) Foreign Application Priority Data
Dec. 29, 2005 (CN) .......................... 2005 1 0135575

(51) Int. Cl.
G06F 1/32    (2006.01)
G06F 1/26    (2006.01)
G06F 1/08    (2006.01)

(52) U.S. Cl. ........ 713/320; 713/300; 713/310; 713/321; 713/322; 713/323; 713/324; 713/330; 713/340; 700/29

(58) Field of Classification Search .................. 713/300, 713/310, 320–324, 330, 340; 702/75; 700/29
See application file for complete search history.

(56) References Cited

U.S. PATENT DOCUMENTS

| 5,630,148 | A | 5/1997 | Norris | |
|---|---|---|---|---|
| 6,425,086 | B1 | 7/2002 | Clark et al. | |
| 6,845,456 | B1 | 1/2005 | Menezes et al. | |
| 7,062,394 | B2* | 6/2006 | Sun | 702/75 |
| 2002/0087611 | A1 | 7/2002 | Tanaka et al. | |
| 2003/0009702 | A1 | 1/2003 | Park | |
| 2006/0253715 | A1* | 11/2006 | Ghiasi et al. | 713/300 |
| 2007/0168055 | A1* | 7/2007 | Hsu et al. | 700/32 |

(Continued)

FOREIGN PATENT DOCUMENTS

CN    1150845 A    5/1997

(Continued)

OTHER PUBLICATIONS

Dirk Grunwald etal, "Policies for Dynamic Clock Scheduling", Proceedings of the 4th Conference on Symposium on Operating System Design & Implementation, vol. 4, 2000.*

(Continued)

Primary Examiner — Thomas Lee
Assistant Examiner — Fahmida Rahman
(74) Attorney, Agent, or Firm — Osha • Liang LLP

(57) ABSTRACT

A method for reducing power consumption of a processor is disclosed comprising steps of applying time-frequency transformation to a plurality of load values of the processor to obtain the feature sampling cycle of the processor, and adjusting the voltage/frequency of the processor based on said feature sampling cycle. With the method of the present invention, the processor load value in next time interval can be accurately predicted, and thus the voltage/frequency of the processor in the next time interval can be adjusted on the basis of the load value.

13 Claims, 2 Drawing Sheets

U.S. PATENT DOCUMENTS

2009/0144572 A1 * 6/2009 Rozen et al. .................. 713/322

FOREIGN PATENT DOCUMENTS

| CN | 1396509 A | 2/2003 |
|---|---|---|
| JP | 2002-202959 A | 7/2002 |
| JP | 2002-44694 A | 8/2003 |
| JP | 2002-99433 A | 9/2003 |
| WO | 2005/066795 A1 | 7/2005 |

OTHER PUBLICATIONS

International Search Report from PCT/CN2006/000478 dated Oct. 26, 2006 (3 pages).
Written Opinion from PCT/CN2006/000478 dated Oct. 26, 2006 (4 pages).
Extended European Search Report issued Jan. 5, 2009, by the European Patent Office in European Patent Application EP-06722130.9-2212 (8 pages).
Smith, Steven W.: "The Scientist and Engineer's Guide to Digital Signal Processing"; California Technical Publishing, San Diego, CA (1997); XP-002507539; ISBN: 0-9660176-3-3; pp. 141-184.
Liu, Xiaotao, et. al., "A Time Series-based Approach for Power Management in Mobile Processors and Disks"; Proceedings of the 14th ACM Workshop on Network and Operating System Support for Audio and Video; Jun. 18, 2004; XP002507538; pp. 74-79.
Stoica, Petre, et. al., "High-Order Yule-Walker Equations for Estimating SinuSoidal Frequencies: The Complete Set of Solutions"; Signal Processing, Elsevier Scient Publishers B.V. Amsterdam, NL; vol. 20, No. 3, Jul. 1, 1990; XP024223040; pp. 257-263.
EPO Communication dated Mar. 11, 2010, issued by the European Patent Office in Application No. EP-06722130.9 (5 pages) (Note: References D1 through D4 were previously submitted to the USPTO in the Supplemental IDS filed May 26, 2009.).
Willis, Dr. M. J., "Proportional-Integral-Derivative Control"; XP-002447926, 19991006 (Oct. 6, 1999); pp. 1-13.
Official Action dated Jan. 25, 2011, issued by the Japan Patent Office for related Japanese Patent Application No. JP 2008-547825 (3 pages).
espacenet English Abstract for JP 2002-044694 (1 page).
espacenet English Abstract for JP 2002-099433 (1 page).
espacenet English Abstract for JP 2002-202959 (1 page).

* cited by examiner

METHOD FOR REDUCING POWER CONSUMPTION OF PROCESSOR

BACKGROUND OF THE INVENTION

1. Field of Invention

The present invention relates to the power consumption conservation of a processor, and in particular to a method for reducing the power consumption of a processor, which can reduce the power consumption of the processor while guaranteeing that the voltage of the processor meets application requirements.

2. Description of Prior Art

Limited battery lifetime usually becomes the most severe bottleneck in a processing system powered by a battery, such as embedded handheld system. On the other hand, playing of multimedia, especially video, has gotten increasing popularity with various handsets, such as PMP and PDA. This gives considerable importance to a low power consumption design for any battery-powered processing system. Moreover, in current handsets, embedded CPUs have been expanded in terms of performance and function, and thus can enable such operation as soft decoding. It is well known that soft decoding is an application requiring intensive processing by CPU and consuming plenty of battery power.

During video soft decoding by CPU, a low power consumption design is generally realized with a technique called DVS/DFS (Dynamic Voltage/Frequency Scaling). One significant task in the DVS technique is selecting a suitable CPU load sampling cycle and predicting CPU load through a proper algorithm so as to determine the magnitudes of voltage and frequency should be set in next time interval. As well known in the art, the selection of sampling cycle has tremendous effect on the performance of DVS. Currently, it is generally believed that the sampling cycle or interval should be the reciprocal of frame rate, since video stream is in unit of frame in most cases. Take as an example a segment of a stream of 30 frames/s, the sampling cycle or interval takes the value of 33 ms, which is regarded as the most suitable. However, many studies have proved that data of CPU load obtained on such sampling interval have a very poor regularity. Thus, it is difficult to present a satisfactory prediction result, leading to the case of voltage being lower than that required by the processor or the case of excessive power consumption of the processor.

Another critical issue in the above low power consumption design based on time interval is how to accurately predict next time interval, since the processor load varies with applications. For example, Reference document 1 (Xiaotao Liu, Prashant Shenoy and Weibo Gong, A Time Series-based Approach for Power Management in Mobile Processors and Disks, In Proceedings of the 14th *ACM Workshop on Network and Operating System Support for Audio and Video* (*NOSS-DAV*)) proposes a time series-based prediction method, in which the value of processor load is predicted using time series. This method, however, gives no discussion about how to adjust the processor power dynamically. In other words, this method cannot precisely predict the value of processor load for next time interval upon changes in the running condition of the processor.

SUMMARY OF THE INVENTION

The present invention is made in view of the above problems. The object of the present invention is to provide a method for reducing power consumption of a processor, which can reduce the power consumption of the processor while guaranteeing that the voltage of the processor meets application requirements.

In one aspect of the present invention, a method for reducing power consumption of a processor is provided comprising steps of applying time-frequency transformation to a plurality of load values of the processor to obtain the feature sampling cycle of the processor, and adjusting the voltage/frequency of the processor based on the feature sampling cycle.

According to an embodiment of the present invention, the step of time-frequency transformation comprises steps of sampling intensively the load of the processor to obtain a first number of processor load values, and applying Fourier transformation to the first number of processor load values to calculate a frequency corresponding to an amplitude peak and a feature sampling cycle corresponding to the frequency.

According to an embodiment of the present invention, the step of adjusting comprises steps of resampling the load of the processor at the feature sampling cycle in the current time interval to obtain a second number of processor load values, constructing a prediction model based on the second number of processor load values to predict the processor load value of the processor in next time interval, and adjusting the voltage/frequency of the processor based on the predicted processor load value.

According to an embodiment of the present invention, the step of constructing the prediction model comprises predicting the processor load value of the processor in next time interval with M processor load values through a linear model as follows:

$$\hat{x}_{t+1} = x_t + \sum_{i=1}^{p} (x_{t-i+1} - x_{t-i})\phi_i; t = 0, 1, 2, 3, \ldots, M$$

where p represents the order of the linear model, and the coefficient $\phi_i$ can be estimated with M processor load values before the current time point by using Yule-Walker equation.

According to an embodiment of the present invention, in the step of adjusting the voltage/frequency of the processor based on the predicted processor load value, the voltage/frequency of the processor is adjusted through a lookup table based on the predicted processor load value.

According to an embodiment of the present invention, in the step of Fourier transformation, the feature sampling cycle is calculated as follows:

$$\tau = (T^*N/2)/f_\tau$$

where T represents the sampling cycle of intensive sampling, N is the first number, and $f_\tau$ is the frequency corresponding to the amplitude peak.

According to an embodiment of the present invention, the step of adjusting comprises steps of resampling the load of the processor at the feature sampling cycle in the current time interval to obtain a second number of processor load values, constructing a prediction model based on the second number of processor load values to predict the processor load value of the processor in next time interval, compensating the predicted processor load value with a compensation factor, and adjusting the voltage/frequency of the processor based on the compensated processor load value.

According to an embodiment of the present invention, the method further comprises repeating the above steps if the change in the compensation factor is greater than a predetermined threshold over a period of time.

According to an embodiment of the present invention, the compensation factor is an additive compensation factor λ, and the step of compensating is performed by adding the additive compensation factor to the predicted processor load value.

According to an embodiment of the present invention, the compensation factor is a multiplicative compensation factor λ, and the step of compensating is performed by dividing the predicted processor load value by the multiplicative compensation factor.

According to an embodiment of the present invention, the additive compensation factor λ is determined as follows:

$$\lambda = K_P e + K_I \int e \, dt + K_D \frac{de}{dt}$$

where e represents the deviation between a statistically-obtained over scaling rate and an over scaling rate set by a user, and $K_P$, $K_I$ and $K_D$ represent proportional gain, integral gain and derivative gain, respectively.

With the method of the present invention, the processor load value in next time interval can be accurately predicted, and thus the voltage/frequency of the processor in the next time interval can be adjusted on the basis of the load value. Further, since the compensation factor can be used to compensate the predicted load value, a timely and accurate adjustment can be made upon any change in the running condition of the processor, so as to reduce the power consumption of the processor while meeting application requirements.

DETAILED DESCRIPTION OF THE PREFERRED EMBODIMENTS

Now, a detailed description will be given to embodiments of the present invention with reference to the figures.

Figure 1:
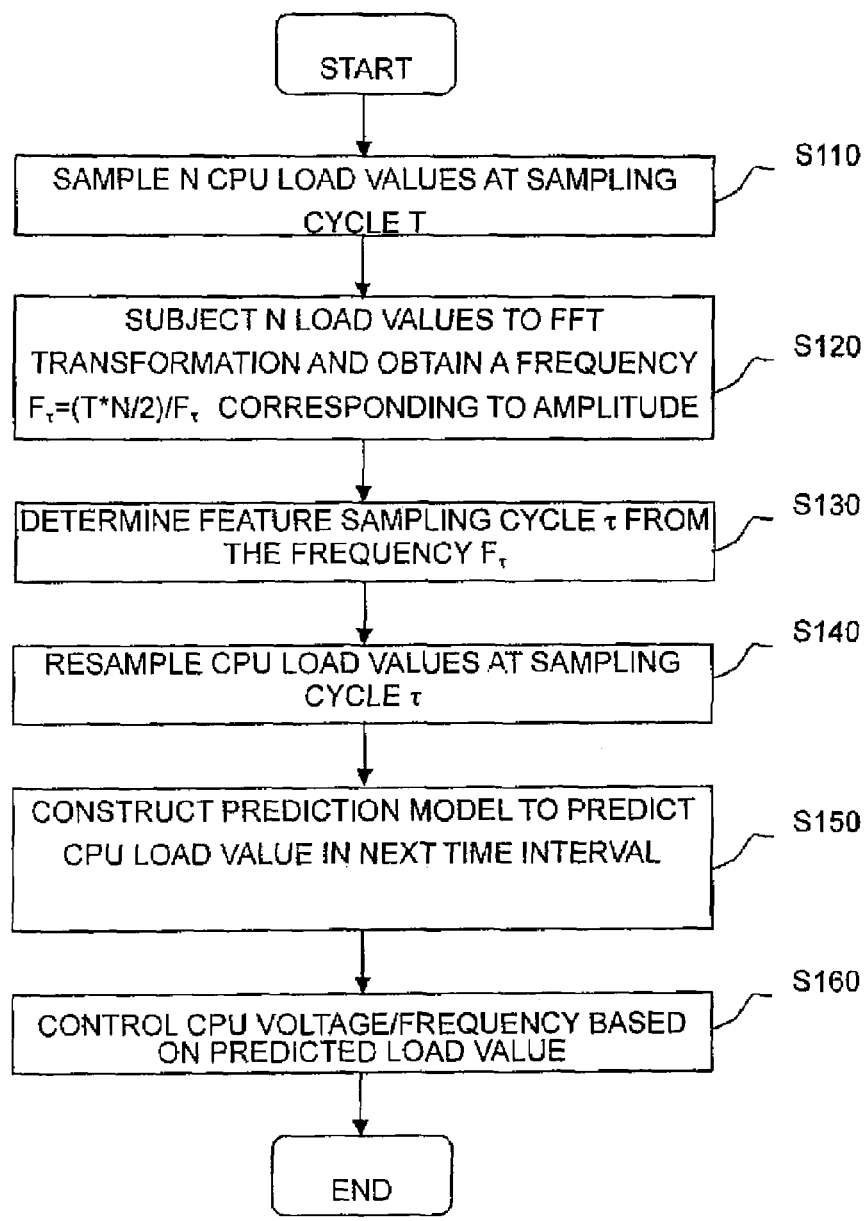
FIG. 1 shows a detained flowchart of a method for reducing power consumption of a processor according to the first embodiment of the present invention.

As shown in FIG. 1, N (=128) CPU load values are initially sampled at certain intensive sampling interval, such as T=10 ms, at step S110. The 128 sampled CPU load values are subjected to FFT transformation so as to obtain a frequency $f_\tau$ corresponding to the amplitude peak for the former half of a cycle at step S120.

Next, the feature sampling cycle is calculated from the frequency $f_\tau$ as $$\tau = (T*N/2)/f_\tau$$

at step S130.

At step S140, the CPU load is sampled at the frequency corresponding to the feature sampling cycle τ to obtain a number of CPU load values, such as 64 values. At step S150, DVS modeling is made from the sampled CPU load values so as to predict the CPU load value in next time interval.

The process of DVS modeling is specifically explained hereafter. Many studies have proved that the CPU load values sampled at the above feature sampling interval τ comply with ARIMA (Auto Regressive Integrated Moving Average) stochastic process to a great extent.

Since the MA process component in the ARIMA process is minute, ignoring such component has no substantial effect on the result. On the other hand, such ignorance can simplify the complexity of the prediction model and relieve computation effort. The major function of the DVS model is to predict the CPU load in the succeeding time interval based on the previous CPU load and thus set a corresponding voltage/frequency.

With ARI (Auto Regressive Integrated) model, the prediction value of the CPU load value at the current time point can be easily represented by M CPU load values before the current time point through a linear model $$\hat{x}_{t+1} = x_t + \sum_{i=1}^{p} (x_{t-i+1} - x_{t-i})\phi_i; \; t = 0, 1, 2, 3, \ldots, M \quad (1)$$

where p represents the order of the ARI model, i.e., the size of observation window, and the coefficient $\phi_i$ can be estimated with the M processor load values before the current time point by using Yule-Walker equation as $$\begin{bmatrix} \hat{\phi}_1 \\ \hat{\phi}_2 \\ \vdots \\ \hat{\phi}_p \end{bmatrix} = \begin{bmatrix} 1 & \hat{\rho}_1 & \hat{\rho}_{p-1} \\ \hat{\rho}_1 & 1 & \hat{\rho}_{p-2} \\ \hat{\rho}_{p-1} & \hat{\rho}_{p-2} & 1 \end{bmatrix}^{-1} \begin{bmatrix} \hat{\rho}_1 \\ \hat{\rho}_2 \\ \vdots \\ \hat{\rho}_p \end{bmatrix} \quad (2)$$

$$\hat{\rho}_k = \hat{\rho}_{-k} = \hat{r}_k / \hat{r}_0, \quad (3)$$

$$\hat{r}_k = \hat{r}_{-k} = \frac{1}{M} \sum_{t=1}^{M-k} x_t x_{t-k}, \; k = 0, 1, 2, 3, \ldots, p; \quad (4)$$

$$t = 0, 1, 2, 3, \ldots, M$$

M is a natural number greater than p.

In this way, the CPU load value in the next time interval can be predicted from the above DVS model. After the predicted CPU load value $\hat{x}_{t+1}$ in the succeeding time slot is obtained, the corresponding voltage/frequency value can be acquired in the simple manner of a lookup table at step S160. For example, $\hat{x}_{t+1}=0.3$ means that the CPU load in the succeeding time interval is only 30% of the load of the CPU running at its peak frequency. Thus, the corresponding voltage value can be found from a voltage-frequency correspondence table provided by the manufacturer of the CPU.

Besides, the DVS-based power conservation is realized by reducing the voltage/frequency of the CPU. This may incur a case where inaccurate prediction or excessive scale-down of the voltage leads to insufficient CPU performance and thus failure of fulfilling an application timely. In an example of video decoding, the playing effect will suffer if one frame, which should have been handled at certain time, cannot be decoded in time.

Figure 2:
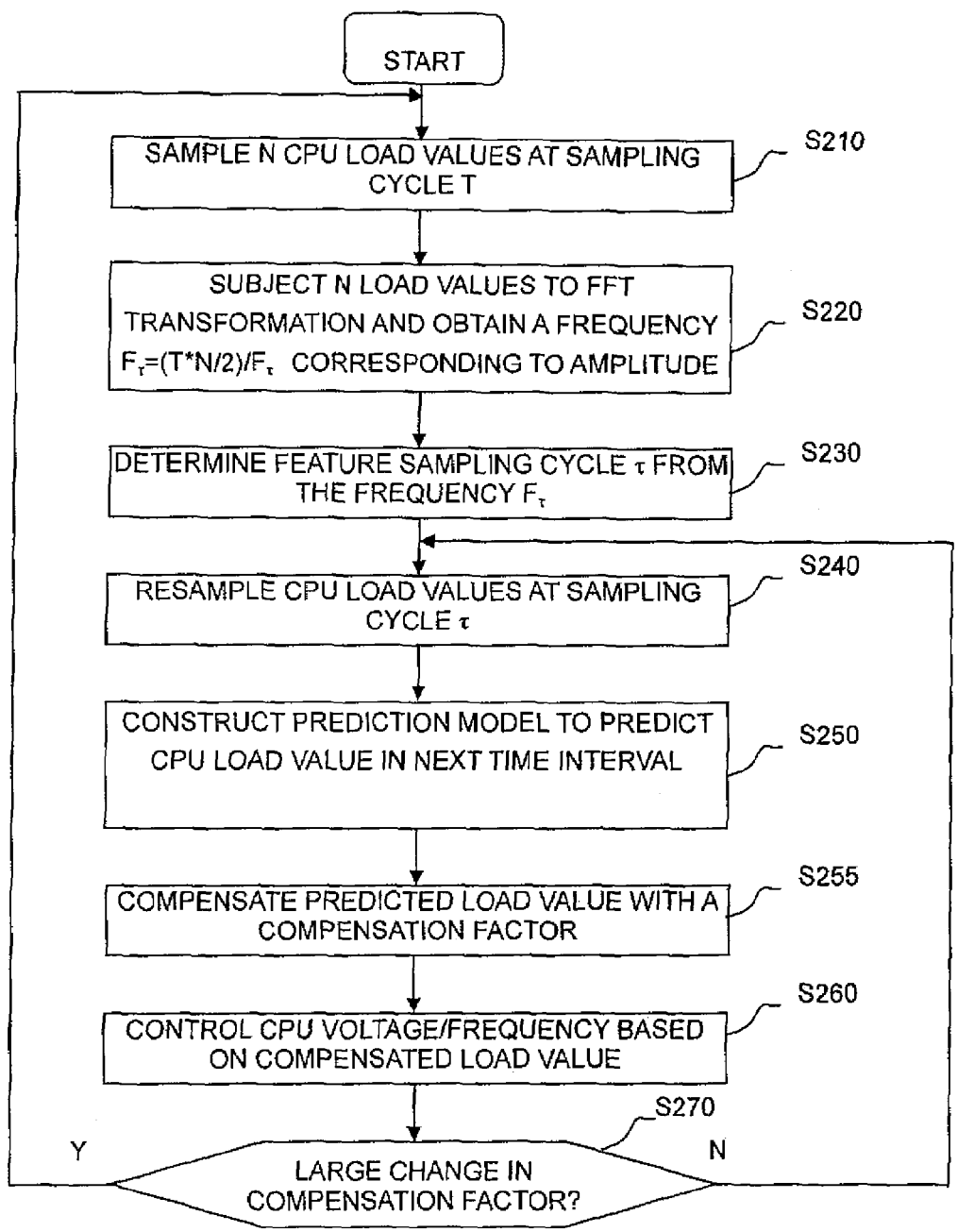
FIG. 2 shows a detained flowchart of a method for reducing power consumption of a processor according to the second embodiment of the present invention.

To address the above problem, an overload control mechanism is adopted to control excessive scaling of voltage so as to protect the system performance from any adverse effect in the second embodiment of the present invention. FIG. 2 shows a detained flowchart of a method for reducing power consumption of a processor according to the second embodiment of the present invention.

Steps S110 to S150 of the method according to the second embodiment are identical to steps S210 to S250 of the method according to the first embodiment of the present invention, and thus description of these steps is omitted.

At step S255, a compensation factor is defined for compensating the predicted CPU load in order to control the scaling magnitude of the CPU voltage. At step S260, it is determined whether the compensation factor has dramatic change over a period of time, i.e., whether the change in the compensation factor exceeds a predetermined threshold (for example, increased by 100%). If the change is strong, it can be derived that the characteristic of the stream has changed. Thus, the sampling frequency is not appropriate, and the corresponding DVS model is not accurate any more. At this point, the flow returns to step S210, where the above same process is repeated. If the change is within an acceptable range, the flow turns to step S240, where the above process is repeated.

Specifically, after a CPU prediction value $\hat{x}_{t+1}$ is obtained, it is compensated with a compensation factor $\lambda$ as a final prediction value. In the second embodiment of the present invention, two types of compensation factors, additive and multiplicative factors, are defined. Then, either of the factors can be controlled so that the ultimate video effect (over scaling rate) is kept in a range preset or acceptable to the user.

The predicted CPU load value is compensated with the additive compensation factor as follows, $$\hat{x}_{t+1} = \hat{x}_{t+1} + \lambda \quad (5)$$

The predicted CPU load value is compensated with the multiplicative compensation factor as follows.

$$\hat{x}_{t+1} = \hat{x}_{t+1}/\lambda \quad (6)$$

The control over the compensation factor is adjusted by a PID controller in the following manner.

$$\lambda = K_P e + K_I \int e \, dt + K_D \frac{de}{dt} \quad (7)$$

where e represents the deviation between a statistically-obtained over scaling rate and an over scaling rate set by the user, and $K_P$, $K_I$ and $K_D$ represent proportional gain, integral gain and derivative gain, respectively. Obviously, when the deviation e is large, $\lambda$ should be increased or decreased accordingly to keep the swing of the over scaling rate within the preset range. As used here, the over scaling rate indicates the number of time intervals among n time intervals in each of which the instructions that should have been completed are not fulfilled due to the excessive scaling-down of the voltage.

With the compensation factor, it is convenient to detect the change in the characteristics of the video stream. A series of characteristics of a video stream must be changing with the change in the stream, thereby making the prediction model inaccurate. This will lead to an increase in the prediction error. And accordingly, the compensation factor is dramatically increased (additive) or decreased (multiplicative) to prevent the over scaling rate from increasing too much.

As such, the change in the system characteristics has been learned, and thus a new model or sampling frequency is required. The flow returns to step S210, where the above process is repeated.

The present invention is not limited to the above embodiments. Any modification, change or substitution readily made by those ordinarily skilled in the art shall fall into the scope of the present invention defined by the appended claims.

What is claimed is:

1. A method for reducing power consumption of a processor comprising steps of:
    sampling a plurality of load values of the processor to obtain a first number of processor load values,
    applying Fourier transformation to said first number of processor load values to calculate a frequency corresponding to an amplitude peak and a characteristic sampling cycle corresponding to said frequency,
    resampling the load values of said processor at said characteristic sampling cycle in current time interval to obtain a second number of processor load values,
    constructing a prediction model based on said second number of processor load values to predict processor load value of said processor in next time interval, and
    adjusting the voltage/frequency of said processor based on the predicted processor load value.

2. The method according to claim 1, wherein said step of constructing the prediction model comprises:
    predicting the processor load value of said processor in the next time interval with M processor load values through a linear model as follows:

$$\hat{x}_{t+1} = x_t + \sum_{i=1}^{p}(x_{t-i+1} - x_{t-i})\phi_i; t = 0, 1, 2, 3, \ldots, M$$

wherein p represents order of the linear model, and the coefficient $\phi_i$ is estimated with the M processor load values before current time point by using Yule-Walker equation, M is the second number.

3. The method according to claim 2, wherein, in said step of adjusting the voltage/frequency of said processor based on the predicted processor load value, the voltage/frequency of said processor is adjusted through a lookup table based on the predicted processor load value.

4. The method according to claim 3, wherein, in said step of applying Fourier transformation to said first number of processor load values, said characteristic sampling cycle is calculated as follows:

$$\tau = (T*N/2)/f_\tau$$

where T represents sampling cycle of sampling, N is said first number, and $f_\tau$ is the frequency corresponding to the amplitude peak.

5. The method according to claim 1, wherein said step of adjusting the voltage/frequency of said processor based on the predicted processor load value comprises steps of:
    compensating the predicted processor load value with a compensation factor, and adjusting the voltage/frequency of said processor based on the compensated processor load value.

6. The method according to claim 5, further comprising:
    repeating the preceding steps if change in said compensation factor is greater than a predetermined threshold over a period of time.

7. The method according to claim 6, wherein said compensation factor is an additive compensation factor $\lambda$, and said step of compensating is performed by adding said additive compensation factor to the predicted processor load value.

8. The method according to claim 6, wherein said compensation factor is a multiplicative compensation factor $\lambda$, and said step of compensating is performed by dividing the predicted processor load value by said multiplicative compensation factor.

9. The method according to claim 7, wherein said additive compensation factor $\lambda$ is determined as follows:

$$\lambda = K_P e + K_I \int e \, dt + K_D \frac{de}{dt}$$

where e represents deviation between a statistically-obtained over scaling rate and an over scaling rate set by a user, and $K_P$, $K_I$ and $K_D$ represent proportional gain, integral gain and derivative gain, respectively.

10. The method according to claim 8, wherein said multiplicative compensation factor λ is determined as follows:

$$\lambda = K_P e + K_I \int e\,dt + K_D \frac{de}{dt}$$

where e represents deviation between a statistically-obtained over scaling rate and an over scaling rate set by a user, and $K_P$, $K_I$ and $K_D$ represent proportional gain, integral gain and derivative gain, respectively.

11. The method according to claim 5, wherein said step of constructing the prediction model comprises:

predicting the processor load value of said processor in next time interval with M processor load values through a linear model as follows:

$$\hat{x}_{t+1} = x_t + \sum_{i=1}^{p}(x_{t-i+1} - x_{t-i})\phi_i; \ t = 0, 1, 2, 3, \ldots, M$$

where p represents order of the linear model, and the coefficient $\phi_i$ is estimated with the M processor load values before current time point by using Yule-Walker equation, M is the second number.

12. The method according to claim 11, wherein, in said step of adjusting the voltage/frequency of said processor based on the predicted processor load value, the voltage/frequency of said processor is adjusted through a lookup table based on the predicted processor load value.

13. The method according to claim 12, wherein, in said step of applying Fourier transformation to said first number of processor load values, said characteristic sampling cycle is calculated as follows:

$$\tau = (T*N/2)/f_\tau$$

where T represents sampling cycle of sampling, N is said first number, and $f_\tau$ is the frequency corresponding to the amplitude peak.

* * * * *